United States Patent [19]

Blair et al.

[11] 4,111,069

[45] Sep. 5, 1978

[54] DRIVE MOTOR MOUNTING BASE FOR A GEAR MOTOR HAVING A C-FACED REDUCER

[75] Inventors: Ronald A. Blair, Pompton Plains; Gerhard A. Nickstadt, Oakland; Gaetano O. Imbrogno, Hawthorne, all of N.J.

[73] Assignee: General Electric Company, Schenectady, N.Y.

[21] Appl. No.: 789,181

[22] Filed: Apr. 20, 1977

[51] Int. Cl.$^2$ ..................... F16H 57/02; F16H 1/12
[52] U.S. Cl. ........................ 74/606 R; 174/421 A
[58] Field of Search ............. 74/421 A, 606 R; 248/2; 310/75 R, 75 D, 89, 83

[56] References Cited

U.S. PATENT DOCUMENTS

| | | | |
|---|---|---|---|
| 2,101,515 | 12/1937 | Schmitter | 74/421 A |
| 2,755,686 | 7/1956 | Bade | 74/606 R X |
| 3,395,594 | 8/1968 | Blair | 74/606 R |
| 3,434,366 | 3/1969 | Raso et al. | 74/421 A |

*Primary Examiner*—Leonard H. Gerin
*Attorney, Agent, or Firm*—Vale P. Myles

[57] ABSTRACT

A mounting base for supporting a standard footed motor in driving relationship on a C-faced reducer of a gear motor to enable it to be driven by the footed motor without requiring the use of a different interface adapter. The motor mounting base is characterized by having two orthogonally disposed walls one of which has a planar surface adapted for engagement with the C-faced reducer, while the other wall has a planar surface for supporting a footed motor. The planar surfaces are machined to be essentially perpendicular and are further characterized by having sets of apertures through their associated walls for receiving mounting bolts to secure, respectively, the mounting base in operating position on the C-faced reducer and the base to a footed motor. The sets of apertures are shaped to afford clearance fits with the securing bolts to enable the footed motor to be accurately aligned with the driven shaft of the gear motor, and to support the footed motor in such an accurately aligned position relative to the gear motor so that a flexible shaft coupling need not be used between the two shafts.

8 Claims, 5 Drawing Figures

DRIVE MOTOR MOUNTING BASE FOR A GEAR MOTOR HAVING A C-FACED REDUCER

BACKGROUND OF THE INVENTION

The invention relates to a footed motor mounting base for supporting a footed drive motor in driving relationship with a gear motor. More specifically, the invention relates to such a motor mounting base that is usable to mount a standard footed motor on a gear motor that is provided with a C-faced reducer so that either a standard footed motor or a C-faced motor can be used alternately to drive the gear motor without requiring the use of any further precision adjustments or adapters to assure appropriate operating alignment of the driving and driven shafts.

Heretofore it has been relatively common practice in the field of gear motor drives to provide drive motor mounting assemblies that enable a given gear motor to be driven alternatively by either a standard footed motor or by a C-faced motor that is supported directly on a C-faced reducer fastened to the gear motor housing. Those alternative drive mounting assemblies usually have one of two common disadvantages. One of these typical disadvantages is the need to use a flexible coupling between the driving and driven shafts to accommodate minor misalignment that inevitably results from the use of commercially available footed motor mounting platforms. The other commonly encountered disadvantage is the need to use precision shaft alignment mechanisms in conjunction with mounting stands that include adjustable bushings adapted to be selectively moved into contact with the feet of a footed motor to accurately support them in positions determined by the precision alignment process. An example of one such prior art mounting assembly and method for mounting a standard footed motor in driving relationship to a gear motor is shown and described in U.S. Pat. No. 3,395,594 which issued on Aug. 6, 1968 and is assigned to the assignee of the present invention. In addition to describing a contemporaneous mounting means for a standard footed motor, that patent generally describes the type of gear motors for use with which the present invention is particularly suited. Thus, for those readers not paticularly familiar with gear motors, reference may be had to that patent for a further understanding of the basic features of typical commercially available gear motors, an appreciation of which will be helpful in understanding the present invention.

Thus, it is apparent that users of gear motors have long recognized that it would be desirable, in terms of convenience and economy, to provide a method and apparatus for alternatively mounting either a standard footed motor or a C-faced motor on a given gear motor. In particular, it would be desirable to provide such alternative drive means for a gear motor while minimizing the number and expense of adapting components needed. In that regard, it would be particularly desirable to eliminate any requirement that a flexible shaft coupling be utilized to achieve a driving connection in either of the alternative arrangements because such flexible couplings are relatively expensive and inevitably necessitate the provision of additional axial spacing between the driving motor and the driven gear motor.

As mentioned above, the known prior art is deficient in providing such an optimum driving arrangement for gear motors. Instead, the prior art mounting arrangements for gear motor drive means inherently are encumbered by one of the two common disadvantages identified above. Accordingly, it is a primary object of the present invention to provide a motor mounting base for supporting a standard footed motor in driving relationship to a gear motor having a C-faced reducer, thereby to enable the standard footed motor to be coupled in driving relationship to the gear motor drive shaft without requiring the use of a flexible coupling between the two shafts.

Another object of the invention is to provide a motor mounting base for mounting a standard footed motor on a gear motor having a C-faced reducer in a manner such that precision shaft-aligning measurements are not necessary and precise supporting adjustments, with adjustable bushings or other means necessarily incorporated in the base for such a purpose, need not be made in order to accurately support the feet of the standard motor in the desired aligned operating relationship with the gear motor drive shaft.

A further object of the invention is to provide a mounting base for supporting a footed motor in driving relationship on a C-faced reducer for a gear motor, in combination with a standard footed motor secured to the mounting base and a gear motor having a driven shaft with a bore formed in the outer end thereof for receiving in snug sliding relationship therein the drive shaft of said motor, and in further combination with a flowable, non-ferrous spacer in the bore between the shafts for resisting fretting of the shafts during their operation.

Additional objects and advantages of the invention will be apparent to those skilled in the art from the description of it contained herein taken in combination with the accompanying drawings.

SUMMARY OF THE INVENTION

In one preferred form of the invention a mounting base for supporting a footed motor in driving relationship on a gear motor having a C-faced reducer is provided to quickly and easily assemble a footed motor in accurately aligned, driving relationship with the gear motor drive shaft. The mounting base is characterized by having a pair of orthogonally positioned walls, one of which is provided with a machined planar surface that engages the C-faced reducer on the gear motor, while the other wall has a machined planar surface that is adapted to support the feet of a footed motor in operating relationship thereon and does so support such a motor when assembled in combination therewith. In addition, the mounting base is characterized by having two sets of apertures through it for receiving in clearance fit relationship therein, respectively, two sets of bolts that secure the mounting base relative to both the C-faced reducer and the feet of the drive motor. A non-ferrous shim or spacing member is disposed between the cylindrical walls of a bore in the gear motor shaft and the periphery of the motor drive shaft positioned therein, in order to provide a flowable, non-fretting and corrosion resistant interface between the two shafts.

BRIEF DESCRIPTION OF A PREFERRED EMBODIMENT

Figure 1:
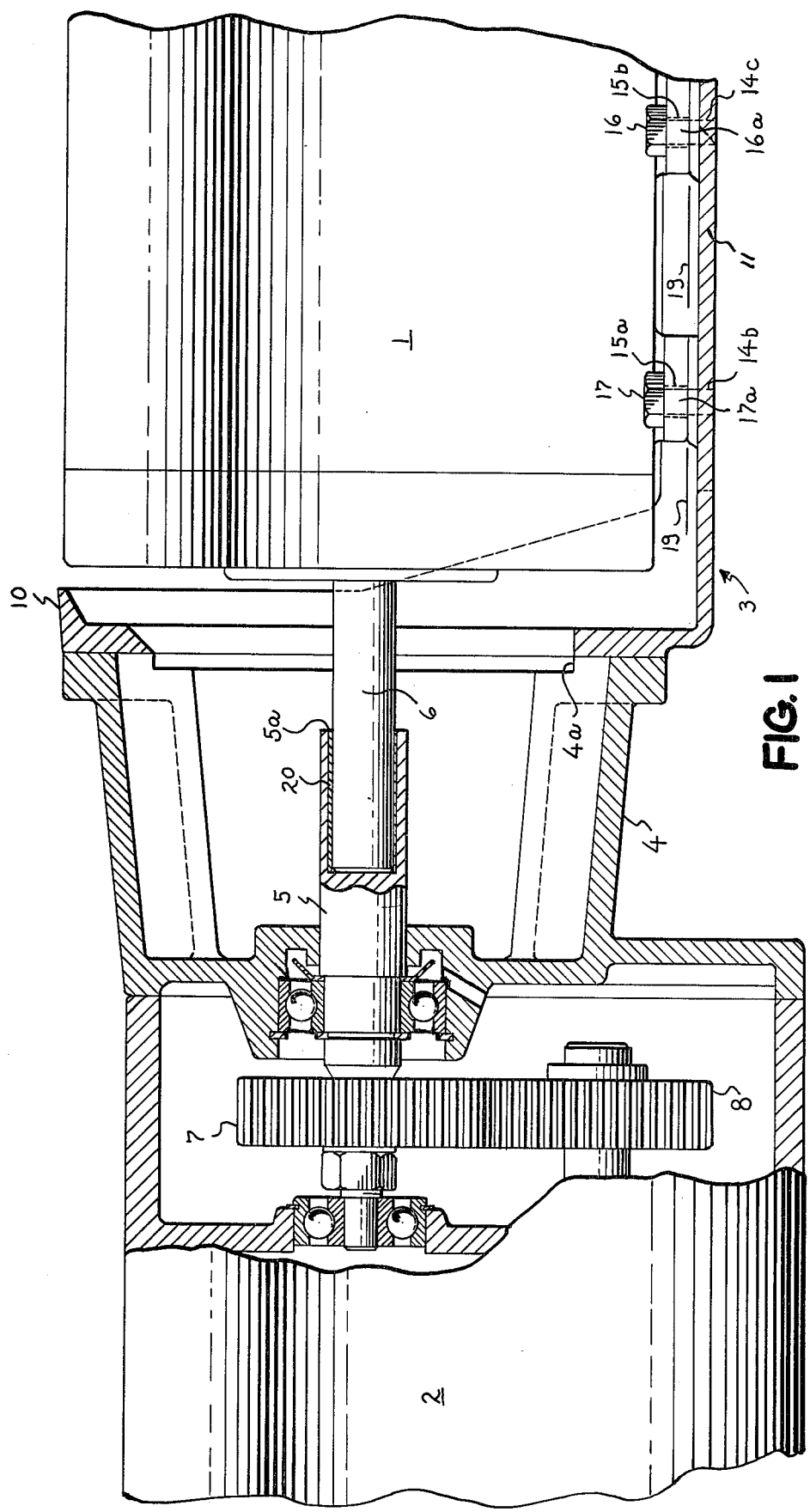
FIG. 1 is a fragmentary, side elevation, partly in cross-section, of one embodiment of the invention shown with respect to a drive motor and a driven gear motor coupled in driving relationship therewith.
Figure 5:
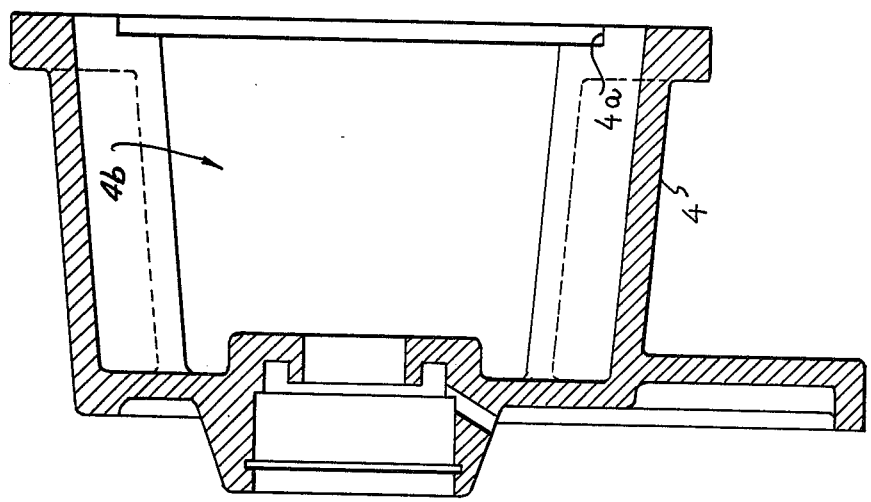
FIG. 5 is a cross-sectional view along the plane 5—5 in FIG. 4 showing a side elevation, cross-section of the C-faced reducer illustrated in FIGS. 1 and 4.

By referring now to FIG. 1 of the drawing, it will be seen that there is illustrated a standard footed electric motor 1, only a fragment of which is shown for purposes of the present description, mounted in driving relationship relative to a gear motor 2, also shown in fragmentary view, and supported on a cast iron mounting base 3 that is constructed pursuant to the present invention. The gear motor 2 has mounted on the input end thereof a conventional C-faced flange or reducer 4 that enables a standard C-faced, electric motor to be quickly mounted in aligned relationship directly on the gear motor to drive its input shaft. As is characteristic of such a standard C-faced reducer, it incorporates a motor registering surface 4a (seen in FIG. 5). However, that surface is not required or used to either support or align the standard footed motor 1 with the mounting base 3 of the present invention, as shown in FIG. 1.

Figure 3:
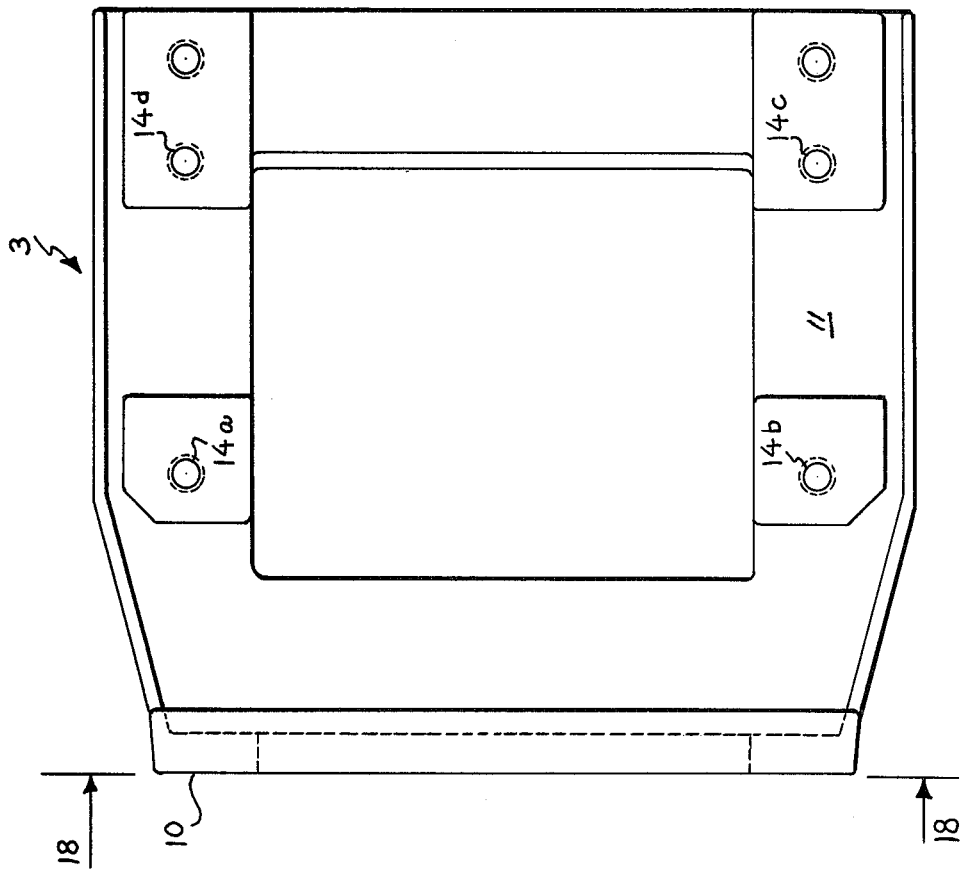
FIG. 3 is a side elevation, partly in cross-section, of the mounting base shown in FIG. 2.
Figure 2:
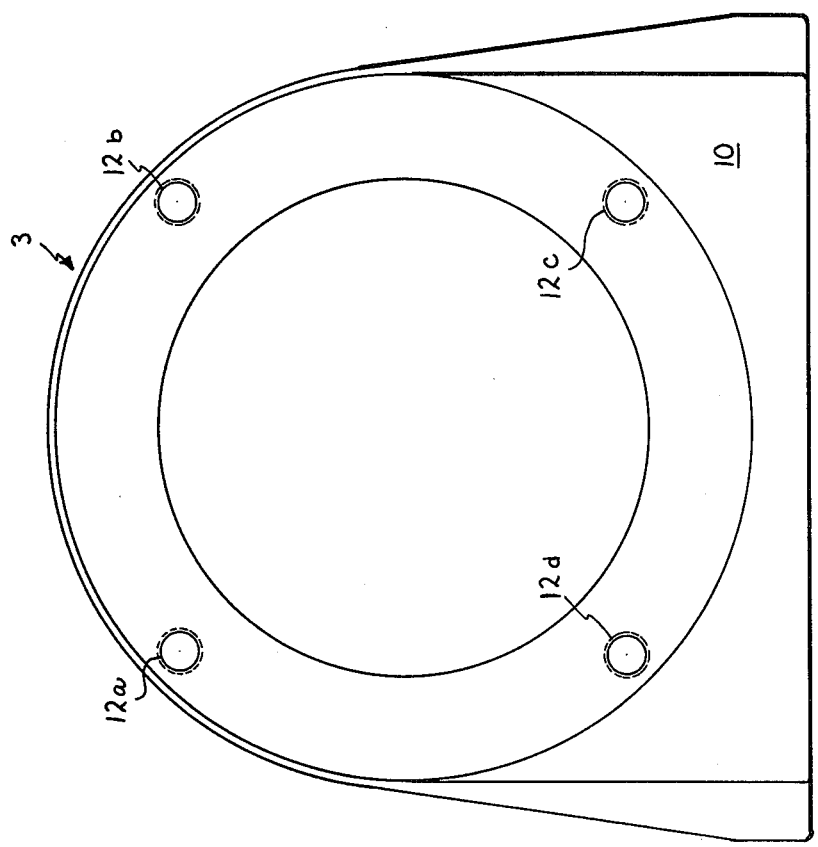
FIG. 2 is a front elevation of the mounting base of the invention shown in FIG. 1.

Refer now to FIGS. 2 and 3 of the drawing in order to more clearly see the distinguishing characteristics of the mounting base 3 of the invention. Pursuant to the teaching of the invention, the base 3 is provided with two walls 10 and 11 that are positioned in orthogonal relationship by their unitary cast iron structure and are further supported by the ribbed configuration of the mounting base 3, as it is shown in the drawings. It should be understood that the base 3 may be formed of other suitable materials, such as aluminum alloy or structural plastic. The walls 10 and 11 are approximately three-eighths inch in thickness in the preferred embodiment being described which is suitable for supporting a motor, such as the motor 1, weighing up to 100 pounds. Of course, thicker walls may be provided in other applications of the invention that require rigid support means for heavier motors.

Figure 4:
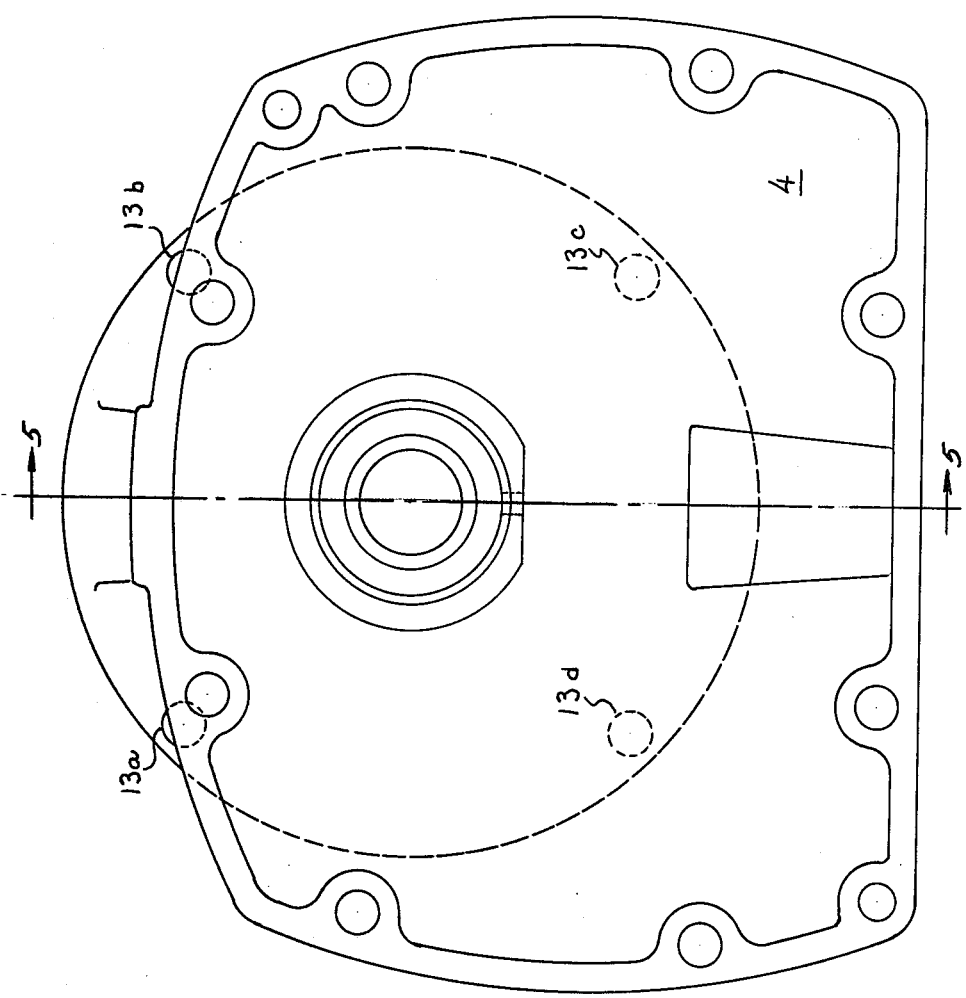
FIG. 4 is a front elevation of the C-faced reducer shown on the gear motor of FIG. 1.

A first set of four apertures 12a, 12b, 12c and 12d is disposed at preselected locations through one of the walls 10 in standard positions designed for alignment with mounting apertures in the coupling flange of a C-faced drive motor. Thus, the apertures 12a–d are arranged to be in precise alignment with cooperating, similarly positioned supporting apertures in the face of the C-faced reducer 4. Such an aligned relationship will be better understood by referring to FIG. 4 of the drawing, in which a front view of the C-faced reducer 4 is shown. It will, thus, be seen that there is another set of apertures 13a, 13b, 13c and 13d that are positioned in the reducer flange to cooperate in general alignment with the apertures 12a–d in the base 3 when these components are mounted in the positions shown in FIG. 1.

The second set of apertures 14a, 14b, 14c and 14d in the mounting base 3 are disposed at preselected locations through the other wall 11. As just explained, the first set of apertures 12a–d are arranged to cooperate in aligned relationship with a third set of apertures 13a–d formed in the motor-abutting surface of a C-faced reducer, such as the reducer 4 shown in FIGS. 1 and 4 of the drawing. Similarly, the apertures of the second set 14a–d are each positioned to cooperate in generally aligned relationship with a fourth set of mounting apertures 15a, 15b, 15c and 15d, each of which are formed respectively through one of the feet of the drive motor 1. Only two of the apertures 15a and 15b in the feet of the drive motor 1 are shown in FIG. 1, but it will be understood that two similar apertures are located in the other two feet of the motor disposed, essentially in mirror image position relative to a plane through the longitudinal axis of the motor, on the backside of the motor as viewed in FIG. 1.

In order to secure the respective components of the assembly shown in FIG. 1 in a precisely aligned, operating relationship, a plurality of threaded bolts is provided so that there will be one bolt available for insertion through each of the operations 12a–d and 14a–d in the first and second sets of apertures through the mounting base 3. In the interest of simplification, only two of such bolts are illustrated in FIG. 1 and designated by the referenced numbers 16 and 17, respectively. An important feature of these bolts and their relationship to the apertures through which they are positioned in operating relationship in the practice of the present invention is that each bolt is provided with a shank portion, such as the shank portion 16a and 17a shown on the bolts in FIG. 1, that is substantially smaller in diameter than at least one of the apertures in one of the aligned set of apertures through which the bolts extend. This relative sizing of these juxtaposed components forms a clearance fit of predetermined size between each bolt and at least one of the apertures through which it extends. For example, as shown in FIG. 1, the diameter of the shank portion 16a of the bolt 16 is substantially smaller than the diameter of the aperture 15b in the foot of motor 1, while the remainder of the threaded shank 16c is of a diameter to thread into the threads formed in the apertures 14d in the mounting base 3.

Similarly, the diameter of shank 17a of bolt 17 is substantially smaller than the aperture 15a in the foot of motor 1 through which it extends and is threaded into the aperture 14a in the mounting base 3. In such an embodiment of the invention the remaining apertures in the third and fourth sets of apertures, i.e., those formed respectively through the C-faced reducer and the feet of the motor 1, will be made of equivalent size so that clearance fits will exist between all of these apertures and the bolts extending through them. Accordingly, it should be understood that the clearance fits between the respective bolts and the associated apertures is made sufficient to enable the motor 1 to be aligned accurately with the axial bore 5a of gear motor 2 when the drive shaft 6 of the motor is slid into that bore 5a. In an alternative embodiment of the invention, which is preferred for some applications, the first set of apertures 12a–d are tapped to receive bolts threaded into them. Such bolts form a clearance fit with the apertures 13a–d of the third set of apertures in the C-faced reducer.

After such optimum alignment of the two shafts is achieved, the motor mounting bolts 16, 17, etc., will be torqued to a desired degree of tightness to further secure the motor 1 in accurate aligned relationship with the driven shaft 5 of gear motor 2. Then, the bolts through the first and third sets of holes in the base 3 and C-faced adapter 4, respectively, are similarly torqued down. It should be appreciated that this sequence of assembly, as described, will serve to clamp the base 3 directly to the feet of motor 1 in a truly aligned relationship without requiring the use of precision aligning instruments of the insertion drums or adjustable bushings between the base 3 and the feet of the motor. This desirable objective of the invention is made possible by the provision of one additional important feature in the base 3. This additional feature is the provision of an accurately machined surface on the wall 10 of the mounting base 3 that abuts the C-faced reducer 4 such that this machined surface defines a first plane 18—18, depicted in FIG. 3 of the drawing. This key feature further requires that the surface of the other wall 11 of the mounting base 3 that is adapted for supporting the feet of the footed drive motor 1 be machined to define a second plane 19—19 (see in FIG. 1) that is substantially perpendicular to the first plane 18—18. This novel configuration of the mounting base 3 enables it to serve readily to accurately support the motor 1 in precisely aligned driving relationship with the drive shaft 5 of gear motor 2, when the feet of motor 1 are drawn against the surface of wall 11 by the securing bolts through the second and fourth set of apertures as described above.

Those skilled in the art will understand that standard footed electric motors, such as the motor 1 used in the preferred embodiment of the invention, are provided with machined foot surfaces that are within 1/32nd of an inch tolerance relative to the centerline of the motor drive shaft 6, thus, in practicing the invention, after the drive shaft 6 is accurately aligned to the bore 5a of the driven shaft 5 of gear motor 2, it is only necessary to first clamp the feet of motor 1 to the machined plane 19—19 on the wall 11 of base 3 then clamp the wall 10 to the face of reducer 4 in order to firmly secure the motor in its desired aligned relationship.

It will be recognized that in practicing the invention to mount a footed motor 1 in driving relationship on base 3 pursuant to the invention, in the manner just described, the C-faced register, or cylindrical recess 4a in reducer 4, does not receive a protruding portion of the abutting end of motor 1, as would be the case if a C-faced motor were being used. Instead, accurate alignment and support of the motor 1 relative to gear motor 2 is achieved by the inter-shaft alignment described in conjunction with the two sets of securing bolts 16 et cetera and 17 et cetera.

An alternative procedure for assembling the base 3 of the invention in combination with a motor, such as the illustrated motor 1, is to prealign the base 3 with the motor 1 while the base 3 is separated from the C-faced reducer 4. To do this, the motor is placed on base 3 and a dial indicator is clamped to the motor shaft 6 to control positioning of the motor so that the shaft 6 is perpendicular to plane 18—18 of wall 10 (see FIG. 3). A set of motor foot bolts, such as the bolts 16, 17, etc., are then torqued down to hold the base 3 and motor 1 in that accurately aligned assembly. This procedure allows the motor base to be completely assembled and stocked separately from the C-faced reducers. Thus, it provides the option of drawing out of stock either a motor base assembly or a C-faced motor for use with a C-faced reducer.

With the foregoing basic features of the invention in mind, reference can again be made to FIG. 1 of the drawing in which the drive shaft 6 of motor 1 is shown disposed in snug, sliding relationship within the bore 5a of the shaft 5 of gear motor 2. It will be understood that this arrangement serves to position the drive shaft 6 in axial alignment with the driven shaft 5. To accommodate such a positioning of the respective shafts 5 and 6, the C-faced reducer 4 includes an open mouth or passageway 4b through which the drive shaft 6 extends. In combination with these components, pursuant to the invention, a non-ferrous shim 20 is disposed in the bore 5a between its sidewalls and the circumference of the drive shaft 6. The shim 20 may be formed of copper, brass or other suitably flowable, non-ferrous material to form a non-fretting, corrosion resistant spacer between the two shafts (5 and 6). A most preferred shim for the invention is one formed of rolled brass coated with a fluorocarbon material, such as those sold under the Teflon name by Dupont Company. It has been found that if such a non-ferrous shim is not utilized the two shafts will, in some applications, fret during normal operation. Such fretting may cause severe grouting of the bore 5a when the shafts are eventually separated, or it might even sufficiently weld the shafts to make them virtually impossible to separate. Thus, the use of a shim, such as the shim 20, is important to an optimum practice of the invention.

In its most preferred form the shim 20 is substantially cylindrical in configuration with only a gap large enough to accommodate a conventional key that is positioned between shafts 5 and 6 to prevent their relative rotation when assembled in the position shown in FIG. 1. Preferably, the shim should reduce the sliding tolerance between the shafts to about 2 to 4 mils before the assembled units are operated. Of course, in addition to the shim materials mentioned. other types of non-ferrous shims may be used in practicing the invention to accomplish the foregoing objectives.

It will also be recognized that additional modifications and improvements in the basic invention as described above may be made without departing from its true spirit or scope. For example, it will be appreciated that each aperture in all four of the above-mentioned sets of apertures, respectively, disposed in the two walls 10 and 11 of mounting base 3 and in the C-faced reducer 4 and the feet of motor 1, may be made relatively large in diameter with respect to the associated bolts 16, 17, etc., disposed through the generally aligned pairs of such apertures. In that type of embodiment such bolts would be provided with threaded nuts to secure the components tightly in operating relationship after the clearance fits are adjusted between each of the apertures and the respective bolts sufficiently to accurately align the drive shaft 6 with the walls of bore 5a in driven shaft 5 of gear motor 2, in the manner described above. Finally, it should be appreciated that as used herein the phrase "predetermined clearance fit" means a clearance between the respective mounting bolts 16, 17, etc., and at least one of the above-described sets of apertures such that the sum of clearances on both sides of the bolts of at least 1/32nd of an inch is provided by each such clearance fit. It has been found that this preselected minimum clearance fit will accommodate the necessary alignment of relevant commercially standard footed motors used in driving gear motors, such as the gear motor 2.

What we claim as new and desire to secure by Letters Patent of the United States is:

1. A mounting base for mounting a footed motor in driving relationship on a gear motor that has a C-faced reducer for supporting a motor in driving relationship thereon, said base having two walls positioned in orthogonal relationship, a first set of apertures formed at preselected locations through one of said walls and a second set of apertures formed at preselected locations through the other of said walls, the apertures of said first set being positioned to cooperate in generally aligned relationship with a third set of apertures formed in a motor abutting surface of a C-faced reducer, the apertures in said second set being positioned to cooperate in generally aligned relationship with a fourth set of mounting apertures each formed respectively through one of the feet of a footed drive motor, the surface of said one wall adapted to abut said C-faced reducer being machined to define a first plane, the surface of said other wall adapted for supporting the feet of a footed drive motor being machined to define a second plane that is substantially perpendicular to said first plane.

2. An invention as defined in claim 1 in combination with a plurality of bolts each of which have a shank portion substantially smaller in diameter than at least one of the apertures in one of said aligned sets of apertures thereby to form a clearance fit of predetermined size between each bolt and said relatively larger diameter at least one of the apertures through which said bolt extends.

3. An invention as defined in claim 2 wherein each aperture in said third and fourth set of apertures is shaped to form a clearance fit with the shank of one of said bolts.

4. An invention as defined in claim 2 in combination with a footed drive motor supported on the machined plane of said other wall, said drive motor including a drive shaft extending beyond one end of the motor housing through a passageway in the C-faced reducer and into an axial bore defined in the driven shaft of a gear motor on which said C-faced reducer is mounted, said motor drive shaft being disposed in snug sliding relationship within said bore thereby to position the drive shaft in axial alignment with the driven shaft, and each bolt of said plurality of bolts being disposed respectively through one of said aligned apertures in the mounting base thereby to secure the base in fixed relationship to the C-faced reducer and the drive motor to further maintain the aligned relationship of said shafts.

5. An invention as defined in claim 4 in combination with a non-ferrous shim disposed in said bore between the sidewalls thereof and said drive shaft to provide a flowable, non-fretting spacer between said shafts.

6. An invention as defined in claim 5 wherein said shim is formed of rolled brass and coated with a fluorocarbon material.

7. An invention as defined in claim 5 wherein each of the apertures in all of said sets of apertures is shaped to form a clearance fit with the shank of one of the respective bolts extending therethrough, and wherein a plurality of nuts are each threaded, respectively, on the ends of each of said bolts thereby to provide means for securing the base in said fixed relationship relative to the C-faced reducer and the footed drive motor.

8. An invention as defined in claim 5 wherein the apertures in said first set of apertures are tapped to receive bolts rotatably threaded into them, and each of the apertures in the remaining three sets of apertures is shaped to form a clearance fit with the shank of one of the respective bolts extending therethrough.

* * * * *